United States Patent
Hu et al.

(10) Patent No.: US 9,036,640 B2
(45) Date of Patent: *May 19, 2015

(54) ENCAPSULATION OF DATA (71) Applicant: LANTIQ DEUTSCHLAND GMBH, Neubiberg (DE)

(72) Inventors: Chung Feng Hu, Singapore (SG); Jia Xiang Shi, Singapore (SG); Ingo Volkenring, Singapore (SG)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 138 days.

This patent is subject to a terminal disclaimer.

(21) Appl. No.: 13/735,510

(22) Filed: Jan. 7, 2013

(65) Prior Publication Data
US 2013/0188655 A1 Jul. 25, 2013

Related U.S. Application Data (63) Continuation of application No. 11/528,030, filed on Sep. 27, 2006, now Pat. No. 8,351,432.

(51) Int. Cl.
H04L 12/28 (2006.01)
H04L 29/02 (2006.01)
H04L 12/46 (2006.01)

(52) U.S. Cl.
CPC ............ H04L 29/02 (2013.01); H04L 12/4633 (2013.01)

(58) Field of Classification Search
USPC .............................................. 370/392, 395.54
See application file for complete search history.

(56) References Cited

U.S. PATENT DOCUMENTS

| | | | |
|---|---|---|---|
| 5,875,192 A | 2/1999 | Cam et al. | |
| 6,717,960 B1 | 4/2004 | Anesko et al. | |
| 6,944,138 B1 | 9/2005 | Song | |
| 6,985,503 B1 | 1/2006 | DeGrandpre et al. | |
| 7,006,509 B1 | 2/2006 | Jagannatharao et al. | |
| 7,768,993 B2 * | 8/2010 | Giese et al. | 370/349 |
| 8,351,432 B2 * | 1/2013 | Hu et al. | 370/392 |
| 2002/0021661 A1 * | 2/2002 | DeGrandpre et al. | 370/219 |
| 2002/0181441 A1 * | 12/2002 | De Paul | 370/352 |
| 2003/0174729 A1 * | 9/2003 | Heink et al. | 370/466 |
| 2003/0219019 A1 * | 11/2003 | Wilson | 370/395.1 |
| 2006/0067317 A1 * | 3/2006 | Engstrand et al. | 370/389 |
| 2006/0104287 A1 * | 5/2006 | Rogasch et al. | 370/395.42 |
| 2006/0285497 A1 * | 12/2006 | Miller et al. | 370/236 |
| 2011/0222402 A1 * | 9/2011 | Gai et al. | 370/230.1 |

* cited by examiner

Primary Examiner — Phuc Tran (57) ABSTRACT

An encapsulation apparatus for encapsulating data includes an input to receive the data, a machine to generate information related to the encapsulation of data and a logic coupled to the machine. A processing machine is coupled to the input and the logic.

20 Claims, 6 Drawing Sheets

ENCAPSULATION OF DATA

RELATED APPLICATIONS

This application is a Continuation application of application Ser. No. 11/528,030, which was filed on Sep. 27, 2006. The entire contents of the co-pending application are incorporated herein by reference.

BACKGROUND

The present application relates to the field of encapsulating data and in particular of encapsulating data into Ethernet frames.

DETAILED DESCRIPTION

The following detailed description explains exemplary embodiments of the present invention. The description is not to be taken in a limiting sense, but is made only for the purpose of illustrating the general principles of embodiments of the present invention. The scope of the invention, however, is only defined by the claims and is not intended to be limited by the exemplary embodiments described below.

Typically, when dealing with data transmission, data are provided in standardized formats such as Ethernet frames comprising of fields related to overhead and a payload field for providing the data which are actually to be transmitted.

In many applications, the data to be transmitted are itself standardized data, having for example a fixed length or having a standardized format such as a ATM cell format. By transmitting these data over an Ethernet link, the data are encapsulated within the Ethernet frame and information regarding the encapsulated data may be provided in order to recognize that the data are encapsulated data or to allow retrieval of the standardized data. The embodiments described as set forth below address the encapsulation of data in an Ethernet frame.

Figure 1:
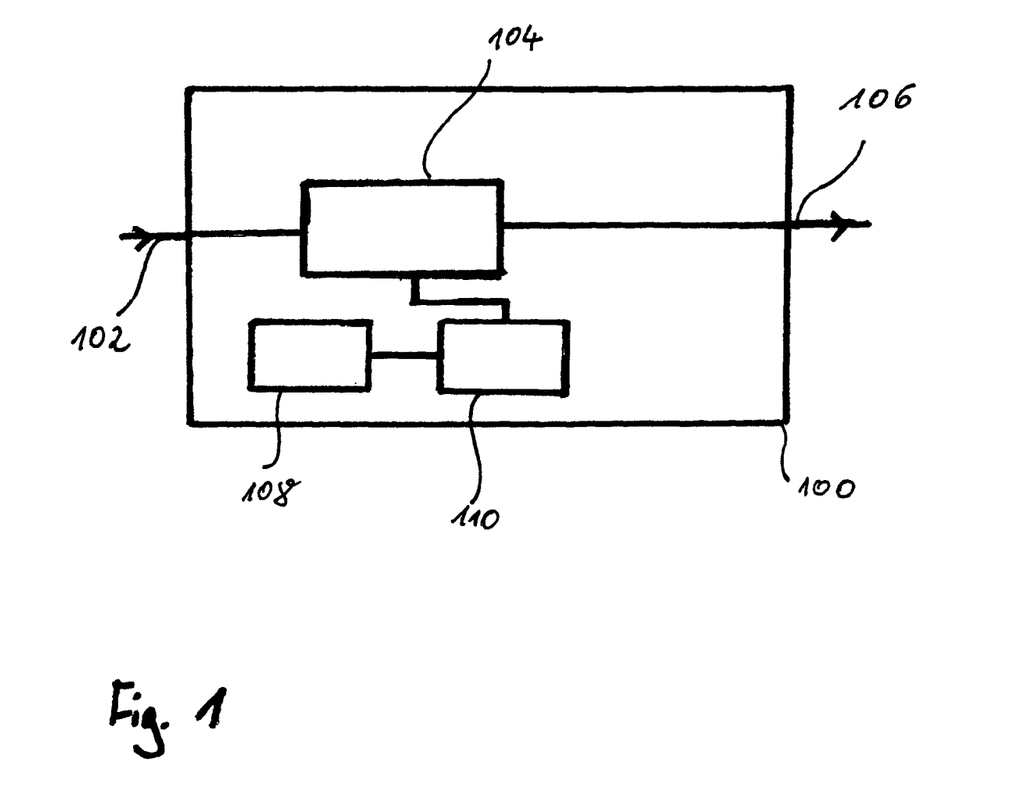
FIG. 1 shows a block diagram according to one embodiment of the present invention.

FIG. 1 shows an encapsulation apparatus 100 according to one embodiment. The encapsulation apparatus 100 comprises an input terminal 102 to receive data. The data received at input terminal 102 are not limited to any format or usage and may for example comprise structured data packets such as ATM cells or non-structured data, data transmitted over xDSL connections or transmitted over other wired or wireless transmission links.

Input terminal 102 is coupled to an Ethernet frame processing machine 104. Ethernet frame processing machine 104 is coupled to an output terminal 106 for transmitting an Ethernet frame generated by Ethernet frame processing machine 104 over an Ethernet-based transmission link. Ethernet-based transmission link may be a wired transmission link comprising an Ethernet cable, for example a 10Base-T or 100Base-T, a fiber optical transmission link such as Gigabit Ethernet or any other Ethernet link.

A machine 108 to generate information related to the encapsulation of the data received by input terminal 102 is coupled to a logic 110. Logic 110 may be implemented in various ways as described below for allowing the information related to encapsulating the data generated by machine 108 to be incorporated within the Ethernet frames transmitted over output terminal 106. To this end, logic 110 is coupled to Ethernet frame processing machine 104.

It is to be noted that according to one embodiment, machine 108 may be coupled to input terminal 102 to provide the information related to encapsulating the data within the Ethernet frame depending on the received data. For example, the information may be related to the number of structured data packets such as for example cells, provided within one Ethernet frame. According to one embodiment, the machine 108 may parse the received data in order to determine a size of the structured data packets or a size of the payload within the structured data packets. Furthermore, according to one embodiment, this information may be provided outside of machine 108 and transmitted to machine 108. It is to be noted that the Ethernet frame processing machine 104, machine 108 and logic 110 may be implemented in hardware, firmware, software or combinations thereof. For example, logic 110 may comprise a hardware logic or may use a look-up table (LUT) in combination with software for performing the function of logic 110 as described below.

Information related to the encapsulation may comprise a plurality of different information such as the number of data packets, for example the number of ATM cells, an indicator or flag within the Ethernet frame indicating that the Ethernet frame comprises encapsulated data or other encapsulation information or ports such as ATM ports provided for transmission. According to one embodiment, an ATM cell related encapsulation is provided wherein ATM cells or modified ATM cells are encapsulated within the Ethernet frames by Ethernet frame processing machine 104.

The operation of the encapsulation apparatus 100 according to exemplary embodiments of the present invention will now be described with respect to FIGS. 2 and 3.

Figure 2:
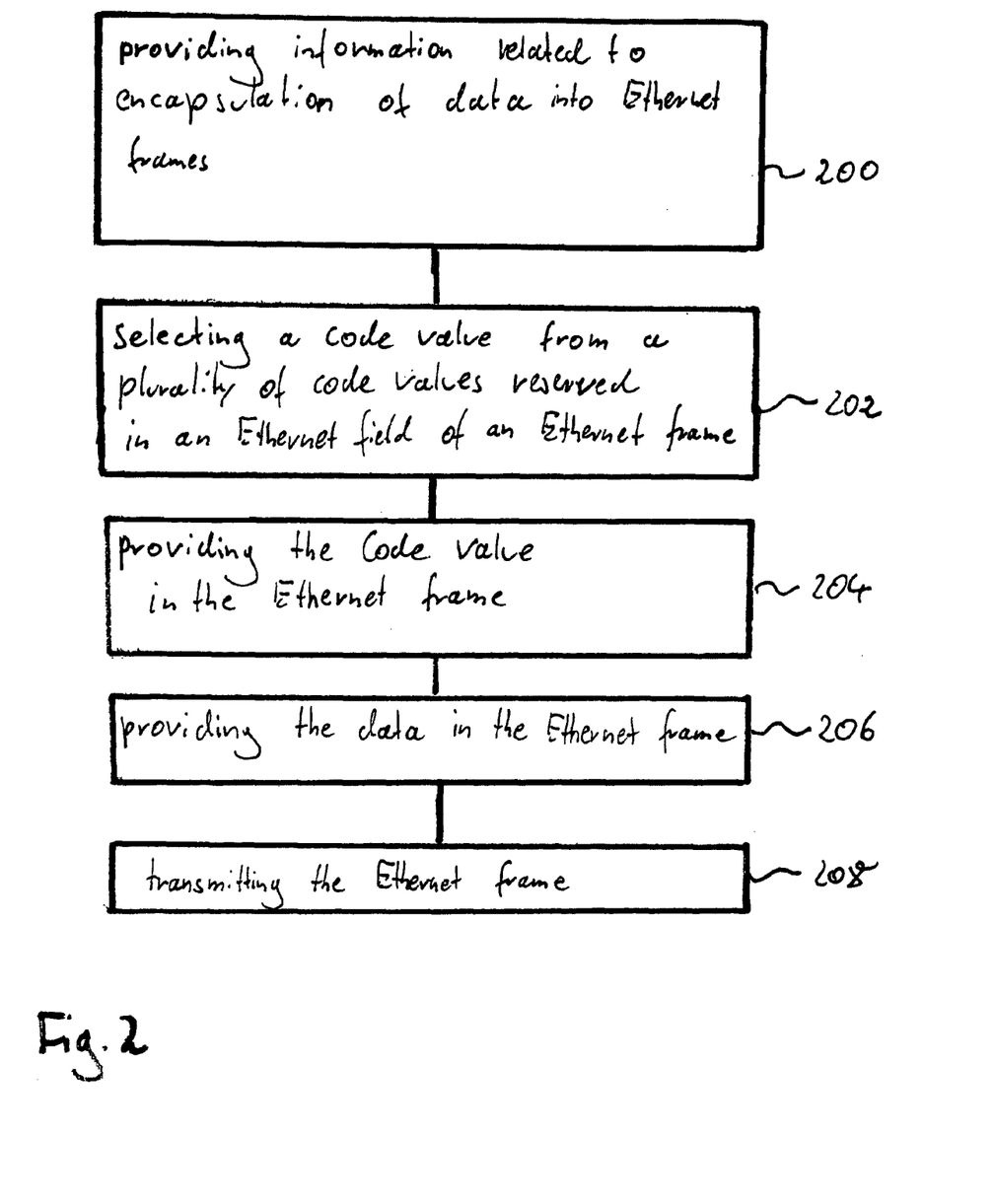
FIG. 2 shows a flow chart diagram according to one embodiment of the present invention.

FIG. 2 shows a flow chart diagram according to one exemplary embodiment. In a first step 200, information related to encapsulation of data into Ethernet frames is provided by machine 108. As outlined above, information related to the encapsulation may comprise a plurality of different information such as the number of data packets, for example the number of ATM cells, an indicator such as a flag or an indicator value within the Ethernet frame indicating that the Ethernet frame comprises encapsulated data or other encapsulation information.

In a step 202, a code value is selected from a plurality of code values reserved in an Ethernet field based on the encapsulation information, by logic 110. Reserved code values in an Ethernet field as used within this application are code values of an Ethernet field which have not been assigned to specific functions by the standard of the Ethernet protocol used for transmitting the Ethernet frames over the Ethernet link coupled to output terminal 106.

In a step 204, the selected code value is then provided in the reserved field of the Ethernet frame by Ethernet frame processing machine 104.

In a step 206 the data are provided in the Ethernet frame in accordance with the code values by Ethernet frame processing machine 104 and the Ethernet frame is transmitted in a step 208 over the Ethernet link coupled to output terminal 106. It is to be noted, that one or more of the steps of the flow chart according to FIG. 2 may be interchanged in other embodiments. For example, step 206 may be performed prior to step 204.

According to one embodiment, the encapsulation apparatus 100 is configured for encapsulation using an Ethernet Reserved Length Encapsulation. According to this embodiment, codes of the length/type field which are reserved in the Ethernet standard family IEEE 802.3 are used for indicating information within the Ethernet frame related to the encapsulation of one or multiple packets within the Ethernet frame. To be more specific, according to the IEEE Standard family 802.3, if the value of this field is less than or equal to 1500 (0x05DC), then the Length/Type field indicates length, i.e. the number of bytes in the subsequent MAC Client Data field of the Ethernet frame. If the value of this field is greater than or equal to 1536 (0x0600), then the Length/Type field indicates the nature of the MAC client protocol (protocol type).

Thus, the Ethernet standard length/type field assignment has a reserved space from 1501 (0x05DD) to 1535 (0x05FF). The reserved space is used according to one embodiment to provide the information generated by machine 108 within the Ethernet frame.

To give only one of many implementations, encapsulation apparatus 100 may implement ATM/EFM over Ethernet encapsulation by assigning encapsulation information to the reserved codes. According to one embodiment, different codes are assigned for indication of different numbers of cells and ATM ports of the transmission. For example, an assignment may be provided as set forth below:

0x05E0: one RAW ATM cell in one Ethernet frame
0x05E1: two RAW ATM cells in one Ethernet frame
0x05E2: three RAW ATM cells in one Ethernet frame
0x05E3: four RAW ATM cells in one Ethernet frame It is to be noted that for example in an embodiment implementing ATM cell encapsulation, the achievable data rate is dependent on the number of ATM cells provided in one Ethernet cell. Over a 100 mbps link, for the above four exemplary types of encapsulation, achievable data rates are 7.8 Mbps (Mega Bits per second), 73.2 Mbps, 80.4 Mbps and 84.5 Mbps.

If two ports, for example ATM port 0 and ATM port 1, are used for transmission, the above assignment of the reserved space from 0x05E0 to 0x05E3 may be assigned to indicate port 0 traffic as outlined above, and in a corresponding manner, the codes 0x05E4 to 0x05E7 may be used to indicate port 1 traffic for the various numbers of cells provided in one Ethernet frame.

According to one embodiment, specific code symbols may be assigned to indicate port traffic of the ATM cells. For example 0x05E0 may be assigned to RAW ATM port 0 traffic and 0x05E1 may be assigned to port 1 traffic, while other codes may be provided to indicate the number of cells within one Ethernet frame.

The size of data, for example the number of cells within one Ethernet frame may be varied or adapted in an adaptive manner using for example software or firmware. If the traffic on the port is too high, a small number of cells may be encapsulated to avoid latency, while otherwise a higher number of cells may be encapsulated into one Ethernet frame in order to utilize the bandwidth.

Figure 4A:
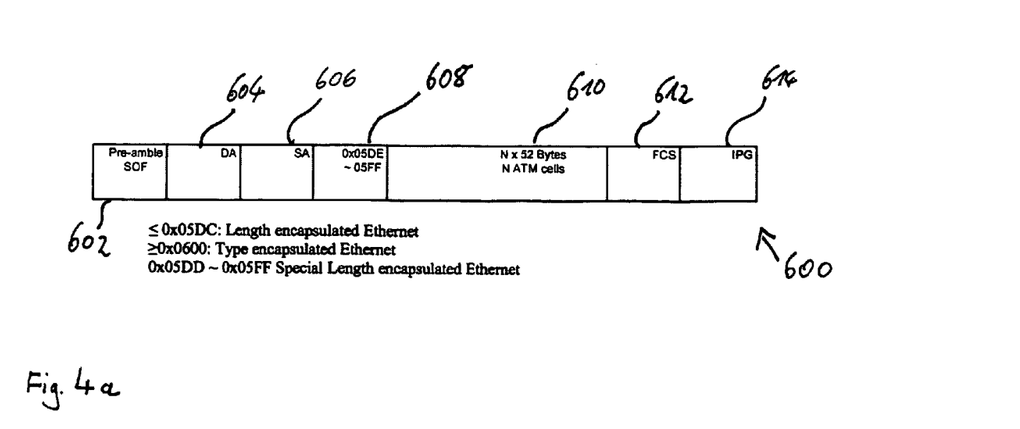
FIGS. 4a and 4b show exemplary Ethernet frames according to embodiments of the present invention.

FIG. 4a shows an exemplary Ethernet frame 600 as may be used in the above described embodiment. The Ethernet frame comprises a Preamble field 602, a destination address field 604 and a source address field 606. Then follows the Type/Length field 608 comprising information regarding the encapsulation of data if one or more ATM cells are been encapsulated within the Ethernet frame. Then, data field 610 comprising the ATM cells encapsulated within the Ethernet frame is provided. After the data field 610, a Frame Check Sum field (FCS field) 612 and an Inter Packet Gap field (IPG field) 614 are provided.

It is to be understood that the above embodiment may be implemented also in software. Thus, according to one embodiment, a computer program for controlling encapsulation of data is provided, the computer program comprising program code, when executed on a computer system, instructing the computer system to perform a selection, based on the encapsulation information, of a code value from a plurality of reserved code values in an Ethernet field and transmitting the selected code value to an output for providing the selected code value in the Ethernet field of the Ethernet frame.

Figure 3:
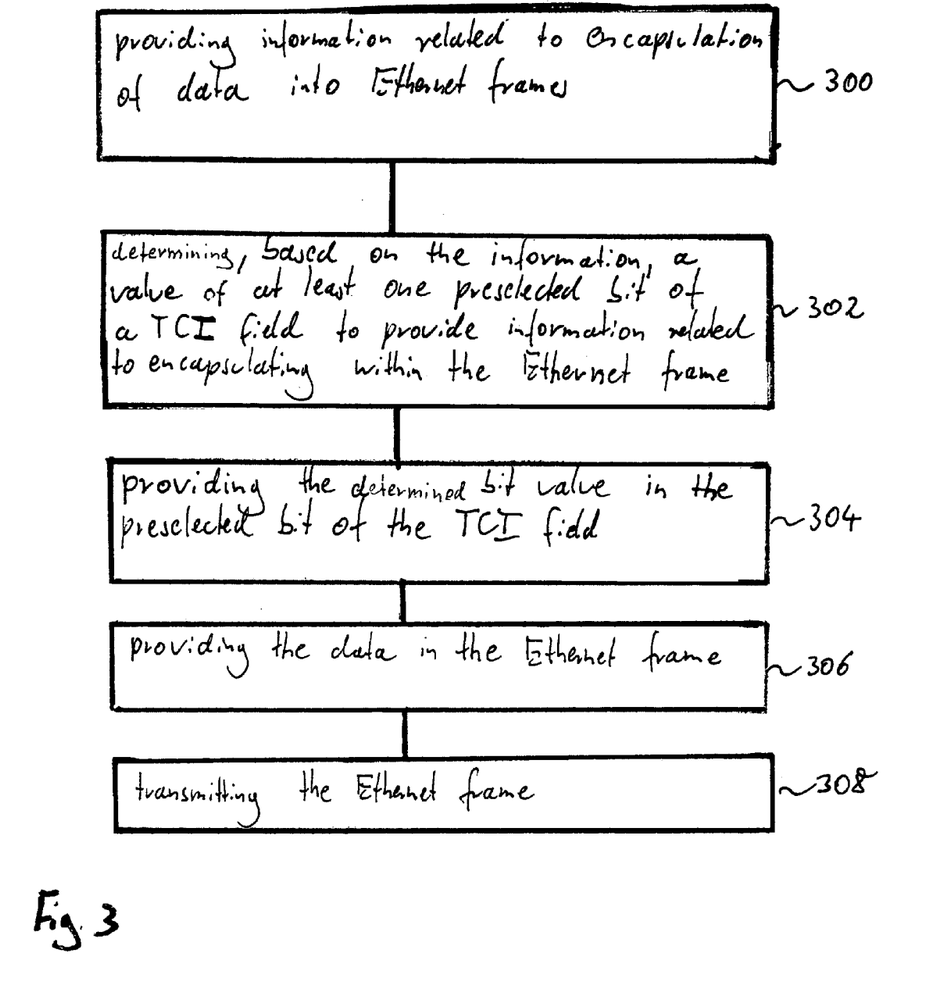
FIG. 3 shows a flow chart diagram according to one embodiment of the present invention.

Referring now to FIG. 3, a further exemplary embodiment of the present invention will be described.

In a step 300, information related to the encapsulation of data into Ethernet frames is provided by machine 108. In a step 302, a value of at least one preselected bit of a TCI (TCI=Tag Control Information field) is determined based on the information provided by machine 108 shown in FIG. 1 to provide information related to encapsulation of the data. To this end, the encapsulation apparatus 100 may comprise in one embodiment a look-up table assigning a plurality of preselected bits of a TCI-field of an Ethernet frame to information related to encapsulation of data and the logic 110 may determine the bit value for one or more of the preselected bits based on the look-up table. According to other embodiments, the logic 110 may be implemented for example fully in hardware or programmable hardware in order to determine the bit value.

In a step 304, Ethernet frame processing machine 104 provides the determined bit value in the preselected bit of the TCI field in order to provide the information related to encapsulation of the data within the Ethernet frame.

According to one embodiment, the encapsulation apparatus uses a VLAN TCI field (VLAN=Virtual Local Area Network, TCI=Tag Control Information) to provide information related to the encapsulation as set forth below.

VLAN TCI field has been provided in Ethernet Standards such as 802.1q and 802.1p in order to allow a general implementation of VLAN for switches. To each VLAN is assigned a VLAN ID for identification of the VLAN. In order to identify each VLAN, the Ethernet frame is extended by inserting 4 Bytes. The 4 Bytes comprise a TPID of 2 Bytes, having a fixed value of 0x8100 to indicate that the frame has 802.1q/802.1p-Tag information. Then follows 3 Bits of user priority, 1 Bit of CFI (Canonical Format Indicator) to indicate whether the format is canonical or non-canonical and 12 Bits for the VLAN ID. The 12 bits allow 4094 VLANS to be identified. In typical networks such as for example SOHO (Small Office Home Office) networks, less or much less than 4094 VLANS are provided. This allows according to one embodiment the use of a predetermined number n of the VLAN ID Bits for providing information related to the encapsulation of cells in the Ethernet frame while m=12−n bits are provided for VLAN identification. According to one embodiment, the last 2 Bits of the VLAN ID may be used to carry the encapsulation information. For example, bit 9 may be assigned to indicate ATM port traffic for 2 ports, and the last two bits, i.e. bits 10 and 51 may be used to indicate the number of cells within the Ethernet frame, for example 1 cell in one Ethernet frame, 2 cells in one Ethernet frame, four cells in one Ethernet frame, and eight cells in one Ethernet frame. According to one embodiment, only one bit, for example bit 11 may be used to indicate ATM port traffic. Furthermore, according to one embodiment, all 12 of the VLAN ID bits may be used to provide encapsulation information such as encapsulation type, traffic source, and ATM ports. In a similar manner to 3 VLAN bits indication coding, priority fields may be also used in one embodiment to indicate ATM port and number of cells within the Ethernet frame.

Figure 4B:
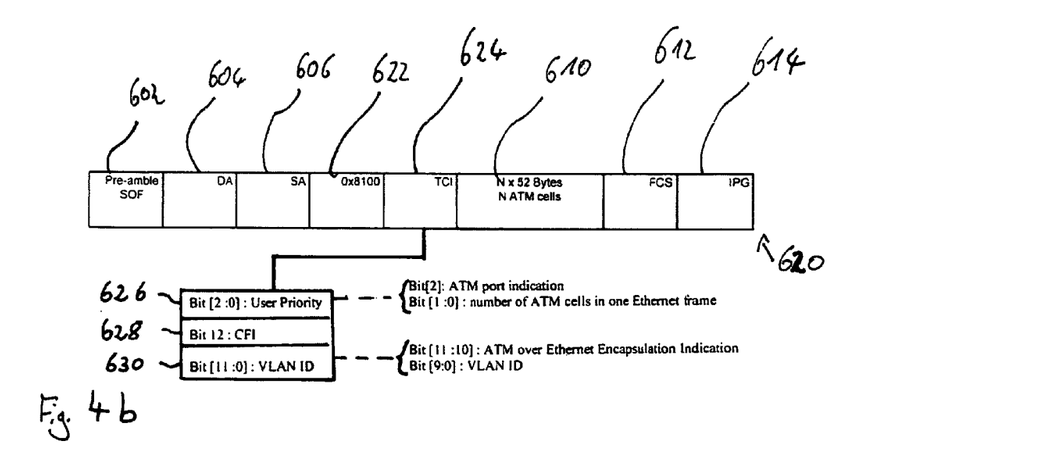

FIG. 4*b* shows an Ethernet frame 620 as provided according to one embodiment for ATM cell encapsulation using VLAN TCI encapsulation. As can be seen, the Ethernet frame 620 comprises the fields 602, 604, 606, 610, 612 and 614 described with respect to FIG. 4*a*. Between the fields 606 and 610 is inserted a TPID field 622 comprising the fixed value 0x8100, and a TCI field 624. The TCI field 624 comprises user priority bits 626, CFI Bit 628, and VLAN ID Bits 630. As shown in FIG. 4*b*, VLAN ID Bits 630 Bits 0 to 9 of the VLAN ID bits are reserved for VLAN Identification, whereas Bits 10 and 51 are reserved for providing information of the ATM over Ethernet Encapsulation indication.

The number of data such as cells within one Ethernet frame may be selected or varied in an adaptive manner using for example software or firmware. If the other traffic on the port is too low, a small number of cells may be encapsulated to avoid latency, while otherwise a higher number of cells may be encapsulated into one Ethernet frame in order to utilize the bandwidth.

Although the above embodiment has been described with respect to ATM cell encapsulation it is to be understood that other embodiments may implement other encapsulations of packets having fixed length such as cells or packets having non-fixed length.

It is further to be understood that the above described Ethernet encapsulation may be implemented according to one embodiment by software or firmware. Thus, according to one embodiment, a computer program is provided for controlling encapsulation of data comprising a program code, when executed on a computer system instructing the computer system to determine, based on the encapsulation information, at least one preselected bit of a TCI field of the Ethernet frame and to transmit the determined code value to an output for providing the determined code value in the Ethernet field of the Ethernet frame.

Figure 6:
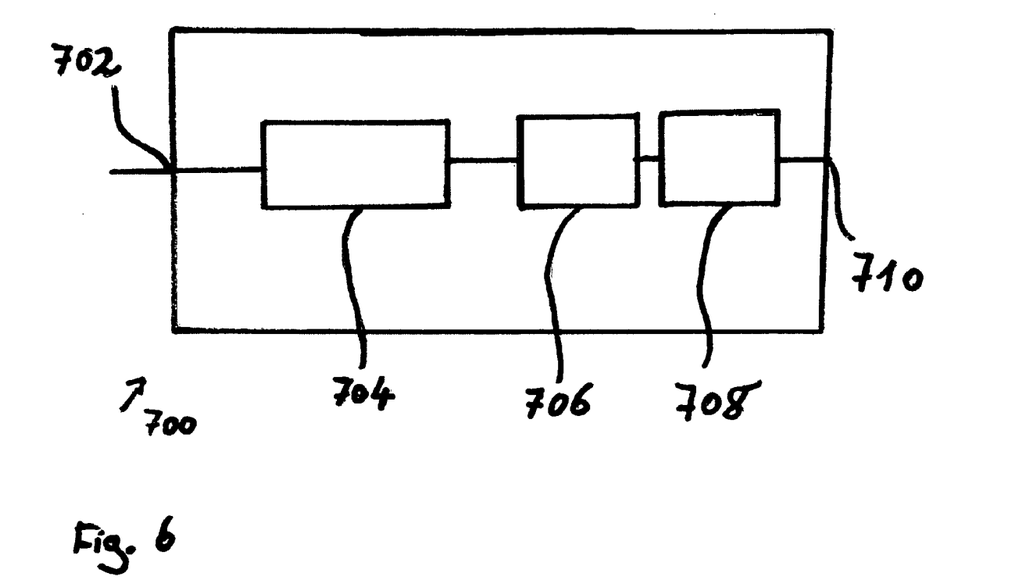
FIG. 6 shows one embodiment of an apparatus to receive an encapsulated Ethernet frame.

While the above described embodiments have been described with respect to an apparatus encapsulating data for transmitting signals, FIG. 6. shows one embodiment of an apparatus 700 to receive an encapsulated Ethernet frame. Apparatus 700 comprises an input 702 for receiving the Ethernet frame, and a parser 704. A machine 706 coupled to the parser generates information related to the encapsulation of data based on the code value. The information related to the encapsulation may be provided to a data processor 708 coupled to the machine 706 for retrieving the data encapsulated in the Ethernet frame and provide the data to an output 710 coupled to the data processor 708. It is to be understood that the apparatus 700 may comprise all variations of the embodiment described with respect to FIGS. 1, 2, 3, 4*a* and 4*b*.

In one embodiment, corresponding to the embodiment described with respect to FIG. 2, the parser may parse a code value provided in a predetermined Ethernet field of the Ethernet frame and to determine whether the code value provided in the Ethernet field is a reserved code value. For example, in the above described embodiment, the predetermined Ethernet field may be the Type/Length field and the reserved code values may be the code values between 0x05DD and 0x05FF.

In one embodiment, corresponding to the embodiment described with respect to FIG. 3, the parser 704 coupled to the input 702 may parse a predetermined bit of a TCI field and determine a value of the preselected bit. The machine 706 may generate information related to the encapsulation of the data based on the value of the preselected bit of the TCI field.

Figure 5:
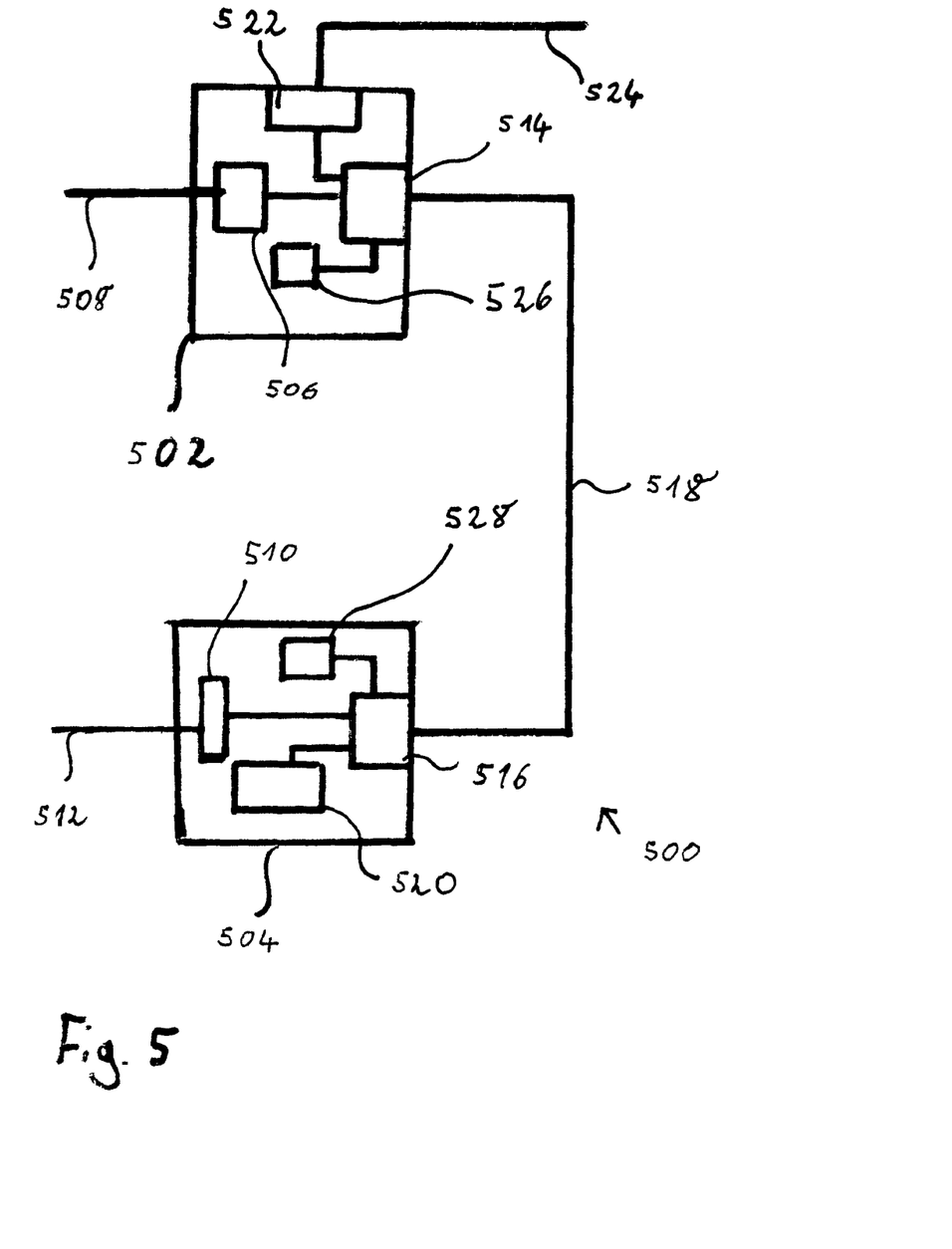
FIG. 5 shows a block diagram according to one embodiment of the present invention.

FIG. 5 shows now a schematic block diagram of one exemplary implementation embodiment of the Ethernet encapsulation as described above wherein the Ethernet encapsulation is provided for communication in a bonding device.

According to FIG. 5, a data stream bonding device 500 is provided implementing Ethernet encapsulation as described above.

Data stream bonding devices such as the data stream bonding device 500 are provided to transmit a single or unified data stream over two or more different telecommunication links. Data stream bonding can be implemented in many ways, for example by inverse multiplexing for wired xDSL access communication links or wireless communication links. To give only one of many embodiments, bonding may be provided according to the af-phy-0086.001 standard for ATM data streams, also known as IMA (Inverse multiplexing over ATM) for ADSL 2 or ADSL 2+ allowing to transceive, between a Central Office and a subscriber or a local area network, a single data stream as a plurality of sub-data streams over a plurality of xDSL communication links such as two-wired copper lines, i.e. from a subscriber or a local area network to a Central Office.

The data stream bonding device 500 according to the embodiment shown in FIG. 5 comprises a first unit 502 and a second unit 504. The first unit 502 comprises a first transceiver 506 coupled to a first telecommunication link 508 receiving and transmitting a first data stream over first telecommunication link 508. Furthermore, the second unit 504 comprises a second transceiver 510 receiving and transmitting a second data stream over a second telecommunication link 512. The transceivers 506 and 510 may be circuits configured for implementing lower protocol layer functions such as the PHY and Data link layer.

The first transceiver 506 is coupled to a first interface 514 establishing a Ethernet communication link 518 to a second interface 516 coupled to the second transceiver 510.

The first and second interfaces 514 and 516 are coupled to a first and second Ethernet encapsulation apparatus 526 and 528, respectively. Ethernet encapsulation apparatus 526 and 528 may be implemented according to one of the embodiments described with respect to FIGS. 2 and 3.

A processor 520 for generating combining information is coupled to the second interface 516. The processor 520 may be a general processor having firmware or software adapted to allow the processor 520 to function as a bonding processor. According to one embodiment, the processor 520 may be a dedicated bonding processor. An aggregating machine 526 for aggregating data of the first and second data stream into a unified data stream according to the combining information is coupled to the first interface 514. A transceiver 522 for transmitting the unified data stream to a data or system link 524 is coupled to the aggregating machine 526.

In the above described embodiment, the Ethernet encapsulation apparatuses 526 and 528 are provided for encapsulating the data transmitted between the first and the second unit such as ATM cells, cell headers or EFM data into a standard Ethernet frame.

It is to be understood that many variations and modifications of the above exemplary described embodiment are possible. According to one embodiment, the aggregating machine 526 may be arranged in the second unit 504 and the unified data stream is transmitted over Ethernet link 518 from the second unit to the first unit for transmitting the unified data stream over link 124 by using the above encapsulation according to the above described embodiments. Furthermore, in other embodiments the transceiver 522 may be arranged outside of the first and second unit and may be coupled to the first and second unit by a communication link different from Ethernet link 518.

Ethernet communication link 518 can be part of a Ethernet communication network allowing the coupling of a plurality of units by connecting a plurality of interfaces to the Ethernet communication link. The Ethernet communication link includes according to one embodiment network devices such as switches, bridges or hubs. According to one embodiment the data stream bonding device 500 is implemented as a distributed bonding system with a wide span.

Ethernet link 518 may comprise any known transport medium including cables, wires in combination with plug-in connectors for connecting separated boxes, as well as a wireless links or combinations of different transport mediums. According to one embodiment, the first and second units 502 and 504 are intended to be arranged on a same PCB (printed circuit board) and the Ethernet link 518 is implemented by routing on the PCB.

According to one embodiment, extension to bonding of more than two telecommunication links is intended by coupling one or more further units comprising a transceiver and an interface to Ethernet communication link 518. According to one embodiment, a system master-bonding master configuration may be extended to include further bonding slaves implementing PHY-layer functions for data streams received over telecommunication links coupled to the bonding slaves. The bonding slaves communicate data of the received data stream via framebase link 518 to the bonding master and receive data via the Ethernet link 518 for transmission over the telecommunication links.

It is to be understood, that the above described implementation of the Ethernet encapsulation is only one of many implementation embodiments of the present invention. In general, the present application may be implemented for any type of data encapsulation independent of the type of data and the function and type of the Ethernet link transmitting the Ethernet frames. For example, the Ethernet encapsulation may be provided in one embodiment for a conventional Ethernet link of a LAN, a SOHO network, a conventional point to point link or a conventional point to multipoint link.

It is further to be understood that in embodiments of the present invention any direct connection or coupling between two points, functional blocks, devices or other physical or functional units shown or described in the following detailed description of exemplary embodiments can be implemented in embodiments by indirect connection or coupling.

What is claimed is:

1. A method for encapsulating data into a frame, comprising:
providing information related to encapsulation of data;
selecting, based on the information, a code value from a plurality of code values reserved in a field of a frame, the selecting being performed at least partially by hardware logic;
providing the code value in the field of the frame; and
providing the data in the frame.

2. The method according to claim 1, wherein the frame is an Ethernet frame.

3. The method according to claim 1, wherein the field is an Ethernet field.

4. The method according to claim 1, wherein the information relates to a number of cells to be provided in the frame.

5. The method according to claim 1, wherein the field is a length/type field of the frame.

6. The method according to claim 1, wherein the information is an encapsulation indicator to provide an indication that the frame comprises encapsulated data, the frame being an Ethernet frame.

7. The method according to claim 1, wherein the code value is at least one preselected bit of a Tag Control Information (TCI) field of the frame.

8. The method according to claim 1, wherein the information is information related to a number of cells to be provided in the frame.

9. The method according to claim 1, wherein the field is the type/length field and the plurality of code values are code values between 0x05DD and 0x05FF.

10. An apparatus, comprising:
a device to generate information related to encapsulation of data;
a selection logic, at least partially embodied in hardware, to select based on the information a code value from a plurality of reserved code values in a field of a frame; and
a frame processor coupled to the logic, the frame processor to provide the selected code value in the field of the frame.

11. The apparatus according to claim 10, wherein the field is a type/length field and the plurality of reserved code values are code values between 0x05DD and 0x05FF.

12. The apparatus of claim 10, wherein the information is information related to a number of cells to be provided in the frame.

13. The apparatus of claim 10, wherein the field is an Ethernet field and the frame is an Ethernet frame.

14. The apparatus of claim 10, wherein the information relates to a data transmission port.

15. The apparatus of claim 10, wherein the information is an encapsulation indicator to indicate that the frame comprises encapsulated data.

16. The apparatus of claim 10, wherein the code value is at least one preselected bit of a Tag Control Information (TCI) field of the frame.

17. A method, comprising:
receiving an Ethernet frame including encapsulated data;
parsing a predetermined bit of a field of the Ethernet frame to determine a value of the predetermined bit; and
generating, by a device to generate information related to encapsulated data, information related to the encapsulated data based on the value of the predetermined bit.

18. The method according to claim 17, wherein the predetermined bit is associated with a Tag Control Information (TCI) field.

19. The method according to claim 17, wherein the information is an encapsulation indicator for indicating that the Ethernet frame comprises encapsulated data.

20. The method according to claim 17, wherein the field is a length/type field of the Ethernet frame.

* * * * *